United States Patent
Tsuji (10) Patent No.: US 12,405,148 B2
(45) Date of Patent: Sep. 2, 2025

(54) FUEL REMAINING AMOUNT MEASURING APPARATUS, BOAT, AND MOVABLE BODY

(71) Applicant: YAMAHA HATSUDOKI KABUSHIKI KAISHA, Iwata (JP)

(72) Inventor: Koichi Tsuji, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 373 days.

(21) Appl. No.: 17/994,427

(22) Filed: Nov. 28, 2022

(65) Prior Publication Data

US 2024/0035871 A1 Feb. 1, 2024

(30) Foreign Application Priority Data

Jul. 28, 2022 (JP) ................. 2022-120184

(51) Int. Cl.
| | |
|---|---|
| *B60L 1/14* | (2006.01) |
| *B63B 79/10* | (2020.01) |
| *B63H 21/14* | (2006.01) |
| *B63H 21/38* | (2006.01) |
| *G01F 23/20* | (2006.01) |
| *G01P 15/18* | (2013.01) |

(52) U.S. Cl.
CPC .............. *G01F 23/20* (2013.01); *B63B 79/10* (2020.01); *B63H 21/14* (2013.01); *B63H 21/38* (2013.01); *G01P 15/18* (2013.01)

(58) Field of Classification Search
CPC .......... B60K 2015/03217; B60K 15/03; G01F 23/20
USPC ................................................ 440/2
See application file for complete search history.

(56) References Cited

U.S. PATENT DOCUMENTS

| | | | |
|---|---|---|---|
| 10,900,822 B1* | 1/2021 | Blackmon | G01F 23/268 |
| 2006/0180371 A1* | 8/2006 | Breed | G07C 5/008 |
| | | | 180/197 |
| 2020/0102879 A1* | 4/2020 | West | F01M 5/005 |
| 2021/0107351 A1* | 4/2021 | Moon | G01F 23/76 |
| 2021/0293590 A1* | 9/2021 | Gillespie | G01F 23/804 |

FOREIGN PATENT DOCUMENTS

| | | |
|---|---|---|
| JP | 07-134054 A | 5/1995 |
| JP | 2004-037085 A | 2/2004 |
| JP | 2008-070282 A | 3/2008 |

* cited by examiner

*Primary Examiner* — Logan M Kraft
*Assistant Examiner* — James J Kim
(74) *Attorney, Agent, or Firm* — Keating & Bennett, LLP (57) ABSTRACT

A fuel remaining amount measuring apparatus for a boat includes a fuel tank containing fuel, a load sensor to measure a weight of the fuel tank, and a corrector to receive a measured value of the weight of the fuel tank detected by the load sensor. The corrector is operable to correct an error due to at least one of a movement or a tilt of the boat.

15 Claims, 7 Drawing Sheets

FUEL REMAINING AMOUNT MEASURING APPARATUS, BOAT, AND MOVABLE BODY

CROSS-REFERENCE TO RELATED APPLICATIONS

The present application claims priority to Japanese Patent Application No. 2022-120184, filed on Jul. 28, 2022. The contents of this application are hereby incorporated herein by reference in their entirety.

BACKGROUND OF THE INVENTION

1. Field of the Invention

The technology disclosed in the present specification relates to a fuel remaining amount measuring apparatus, a boat, and a movable body.

2. Description of the Related Art

A boat is provided with a propulsion device. The propulsion device includes an internal combustion engine, for instance, and uses fuel contained in a fuel tank to generate a propulsion force.

Generally, a remaining amount of fuel in a fuel tank is measured by using a float to detect a liquid level in the fuel tank. Depending on the shape of the fuel tank, however, the lowering of the liquid level per unit volume of decreasing fuel is not necessarily uniform in amount. In addition, the liquid level in the fuel tank may vary with the movement or tilt of the boat. Consequently, if a fuel remaining amount measuring method based on the detection of the liquid level is used, the measurement accuracy may be reduced.

In order to improve the accuracy of fuel remaining amount measurement, it is conventionally proposed to use a load sensor to measure the weight of the fuel tank so as to measure the remaining amount of the fuel (see JP 2004-37085A, for instance).

A measured value of the weight of the fuel tank detected by using the load sensor may vary with the movement or tilt of the boat. Therefore, a conventional fuel remaining amount measuring method where the load sensor is used to measure the weight of the fuel tank still leaves room for improvement in the measurement accuracy. This problem is not unique to the fuel remaining amount measurement in the fuel tank provided on the boat but is also a problem for the fuel remaining amount measurement in a fuel tank provided on a movable body such as a vehicle or an aircraft.

SUMMARY OF THE INVENTION

Preferred embodiments of the present invention provide solutions to the above problem.

Preferred embodiments of the present invention are realized in the following aspects, for instance.

A fuel remaining amount measuring apparatus for a boat according to a preferred embodiment of the present invention includes a fuel tank containing fuel, a load sensor to measure a weight of the fuel tank, and a corrector to receive a measured value of the weight of the fuel tank detected by the load sensor, and to correct an error due to at least one of a movement or a tilt of the boat.

In this fuel remaining amount measuring apparatus, the detection of the liquid level in the fuel tank with a float is not utilized, but the fuel remaining amount measurement in which an error due to the movement or the tilt of the boat is corrected is performed, which improves the accuracy of the fuel remaining amount measurement.

Another fuel remaining amount measuring apparatus for a movable body according to a preferred embodiment of the present invention includes a fuel tank containing fuel, a load sensor to measure a weight of the fuel tank, and a corrector to receive a measured value of the weight of the fuel tank detected by the load sensor, and to correct an error due to at least one of a movement or a tilt of the movable body.

In this fuel remaining amount measuring apparatus, the detection of the liquid level in the fuel tank with a float is not utilized, but the fuel remaining amount measurement in which an error due to the movement or tilt of the movable body is corrected is performed, which improves the accuracy of the fuel remaining amount measurement.

Preferred embodiments of the present invention are realized in various aspects as fuel remaining amount measuring apparatuses, boats or movable bodies including fuel remaining amount measuring apparatuses, fuel remaining amount measuring methods, and the like.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
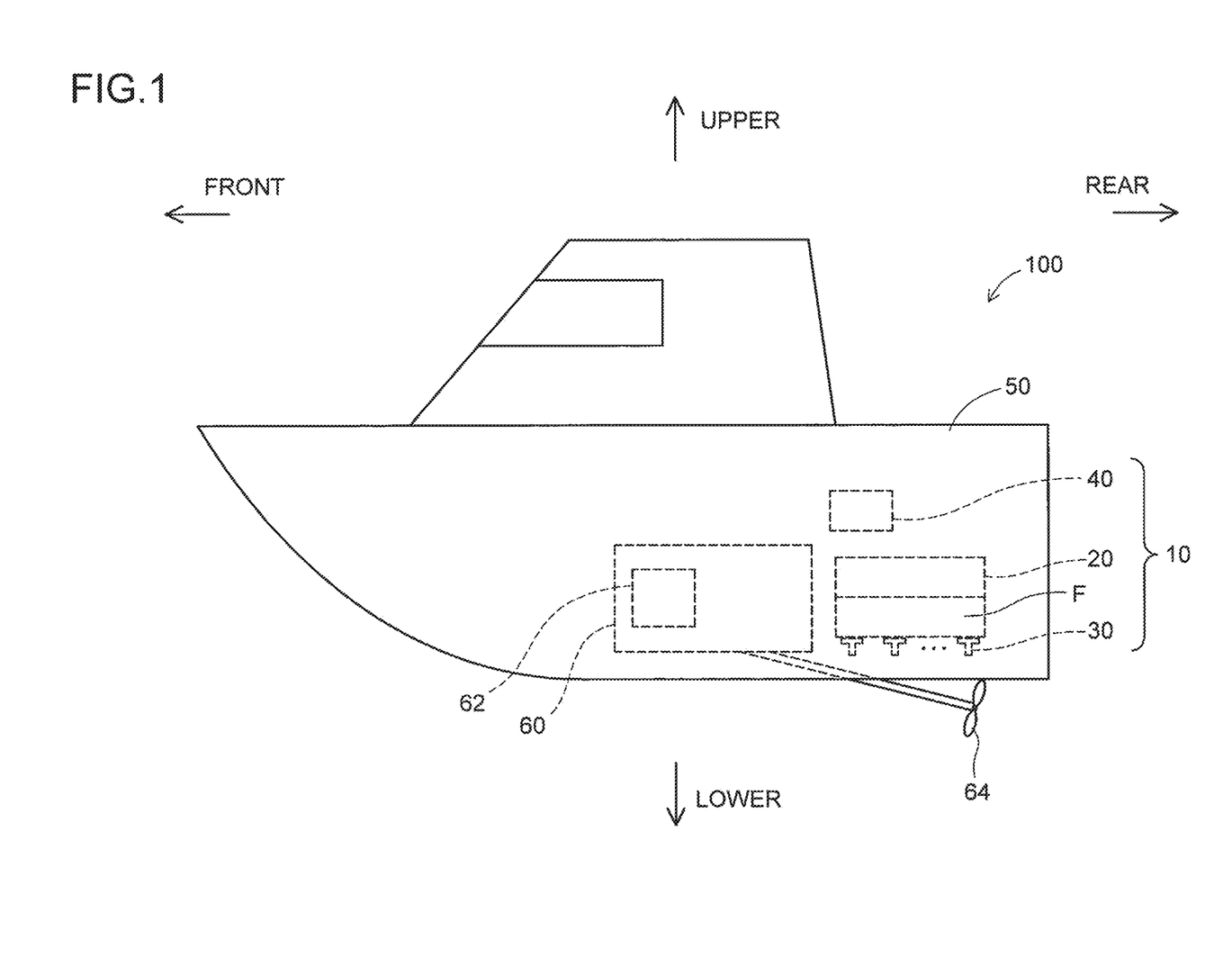
FIG. 1 is a diagram schematically illustrating a configuration of a boat according to a first preferred embodiment of the present invention.

FIG. 1 is a diagram schematically illustrating a configuration of a boat 100 in a first preferred embodiment of the present invention. In FIG. 1 and other figures mentioned below, arrows represent directions defined based on a position of the boat 100. To be more specific, in each of the figures, arrows represent a forward direction (FRONT), a rearward direction (REAR), an upward direction (UPPER), and a downward direction (LOWER), respectively.

The boat 100 includes a hull 50, a propulsion device 60, and a fuel remaining amount measuring apparatus 10. The hull 50 is a section of the boat 100 where a crew is on board.

The propulsion device 60 generates a propulsion force to propel the boat 100. In the present preferred embodiment, the propulsion device 60 is at least partially located in a lower space in the hull 50. The propulsion device 60 may be located in a different place (behind the hull 50, for instance). The propulsion device includes a power source 62 including an internal combustion engine, for instance, and a propulsion force generation mechanism 64 such as a propeller that is driven by a driving force from the power source 62 so as to generate the propulsion force. The propulsion device may include a steering mechanism and a shift mechanism, neither of which is illustrated. The steering mechanism steers the boat 100. The shift mechanism is operable to change between a headway state where the driving force from the power source 62 is transmitted to the propulsion force generation mechanism 64 in a direction enabling the boat 100 to make headway, a sternway state where the driving force from the power source 62 is transmitted to the propulsion force generation mechanism 64 in a direction enabling the boat 100 to make sternway, and a neutral state where the driving force from the power source 62 is not transmitted to the propulsion force generation mechanism 64.

Figure 2:
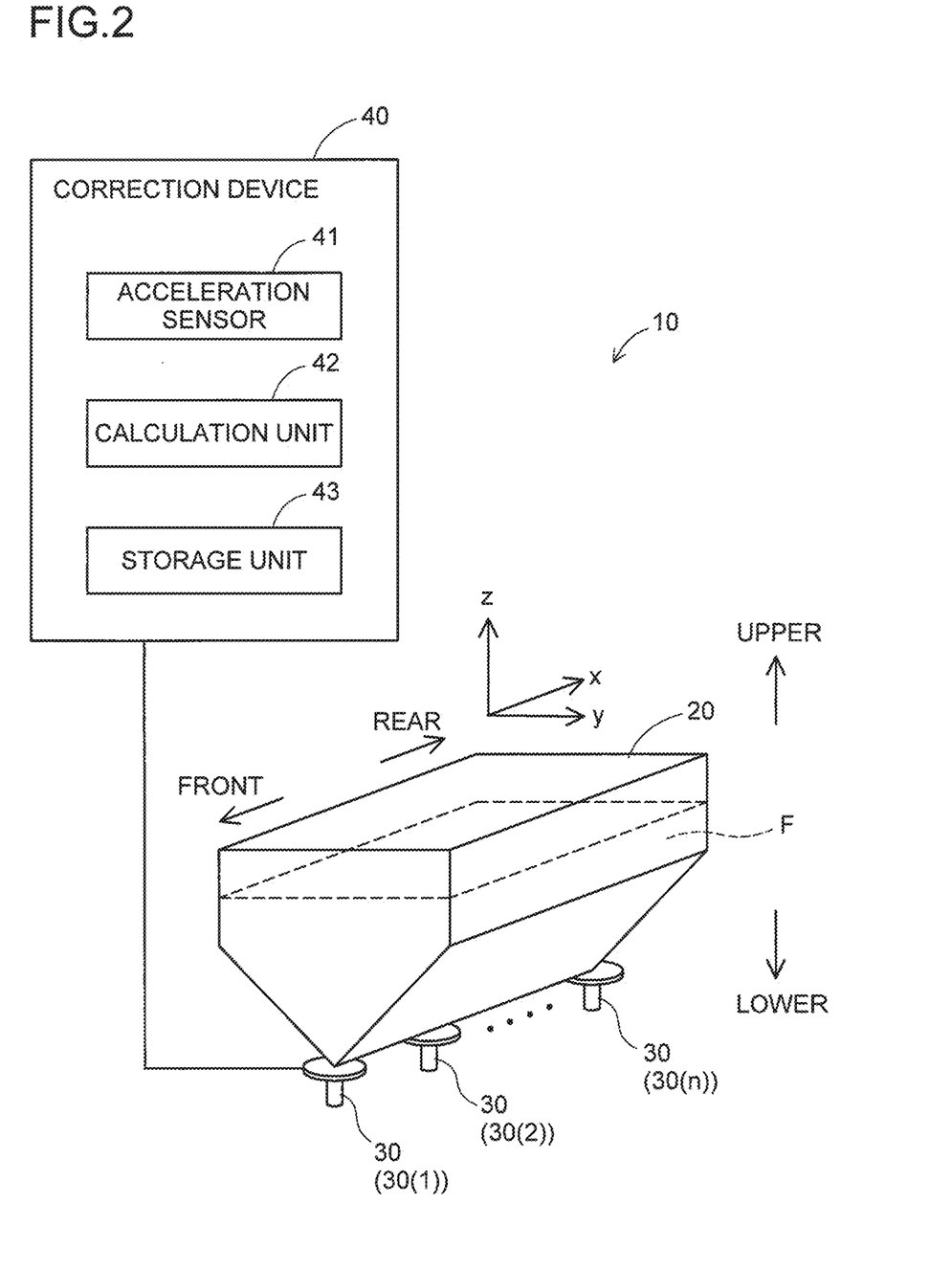
FIG. 2 is a diagram illustrating a configuration of a fuel remaining amount measuring apparatus according to the first preferred embodiment of the present invention.

The fuel remaining amount measuring apparatus 10 measures a remaining amount of fuel on the boat 100. FIG. 2 is a diagram illustrating a configuration of the fuel remaining amount measuring apparatus 10 according to the first preferred embodiment. As illustrated in FIGS. 1 and 2, the fuel remaining amount measuring apparatus 10 includes a fuel tank 20, a load sensor 30, and a correction device 40.

The fuel tank 20 contains fuel F (diesel oil or gasoline, for instance) to be fed to the power source 62 of the propulsion device 60. In the present preferred embodiment, the fuel tank 20 is located in the lower space in the hull 50. As illustrated in FIG. 2, the fuel tank 20 has a horizontal cross-sectional area varying according to a position in a vertical direction. To be more specific, the fuel tank 20 includes an upper portion that is substantially rectangular-parallelepiped in shape and a lower portion that is narrowed so that the horizontal cross-sectional area may be smaller at a lower position. As a result, the amount of lowering of a liquid level of the fuel F per unit volume of the decreasing fuel F is uniform when the liquid level is in the upper portion of the fuel tank 20, and is sequentially increased as the liquid level lowers when the liquid level is in the lower portion of the fuel tank 20. Thus, the fuel tank 20 in the present preferred embodiment has a shape that may cause a reduction in the measurement accuracy if the fuel remaining amount measuring method, in which a float is used to detect the liquid level in the fuel tank 20 so as to measure the remaining amount of fuel, is used.

The load sensor 30 measures the weight of the fuel tank 20, and includes a load cell, for instance. In the present disclosure, the weight of the fuel tank 20 refers to a weight of the fuel tank 20 including the weight of the fuel F contained in the fuel tank 20. In other words, the weight of the fuel tank 20 varies with the remaining amount of the fuel F in the fuel tank 20. In the present preferred embodiment, the fuel remaining amount measuring apparatus 10 includes n (n being 2 or a greater integer) load sensors 30 (30(1), 30(2), ..., and 30(n)). The load sensors 30 support the fuel tank 20 from below the fuel tank 20 and as such output measured load values (LC(1), LC(2), ..., and LC(n)) corresponding to the weight of the fuel tank 20. A measured value T1 of the weight of the fuel tank 20 detected by the load sensors is the sum of values LC output from the respective load sensors 30, as expressed as Formula (1) below.

$$T1 = LC(1) + LC(2) + \ldots + LC(n) \qquad (1)$$

The correction device 40 receives the measured value T1 of the weight of the fuel tank 20 detected by the load sensors 30, and corrects an error due to at least one of a movement or a tilt of the boat 100. To be specific, the measured value T1 of the weight of the fuel tank 20 detected by the load sensors 30 may include an error due to at least one of the movement and the tilt of the boat 100. The correction device 40 corrects such error so as to calculate weight TO of the fuel tank 20 in a reference state (a state where the speed and the tilt of the boat 100 are both zero). The correction device 40 includes an acceleration sensor 41, a calculation unit 42, and a storage unit 43.

The acceleration sensor 41 detects acceleration of the boat 100, and is fitted to the hull 50. In the present preferred embodiment, the acceleration sensor 41 detects the acceleration in a plurality of directions. Specifically, the acceleration sensor 41 detects and outputs accelerations (gx, gy, and gz) in directions where three axes (x-axis, y-axis, and z-axis) orthogonal to one another extend, respectively.

The calculation unit 42 performs an operation for error correction and includes a central processing unit (CPU), a multi-core CPU or a programmable device (such as a field-programmable gate array (FPGA) and a programmable logic device (PLD)), for instance. The storage unit 43 includes a read-only memory (ROM), a random access memory (RAM), a hard disk drive (HDD), or a solid-state drive (SSD), for instance. The storage unit 43 stores various kinds of programs and data, and is used as a work area and a data storage area required when various processes are performed. As an example, a value of weight Te in the reference state of the fuel tank 20, which does not contain the fuel F (that is to say, in which the remaining amount of the fuel F is zero), values (gx0, gy0, and gz0) output from the acceleration sensor 41 in the reference state for the respective axes, and specific gravity d of the fuel F contained in the fuel tank 20 are stored in the storage unit 43.

Figure 3:
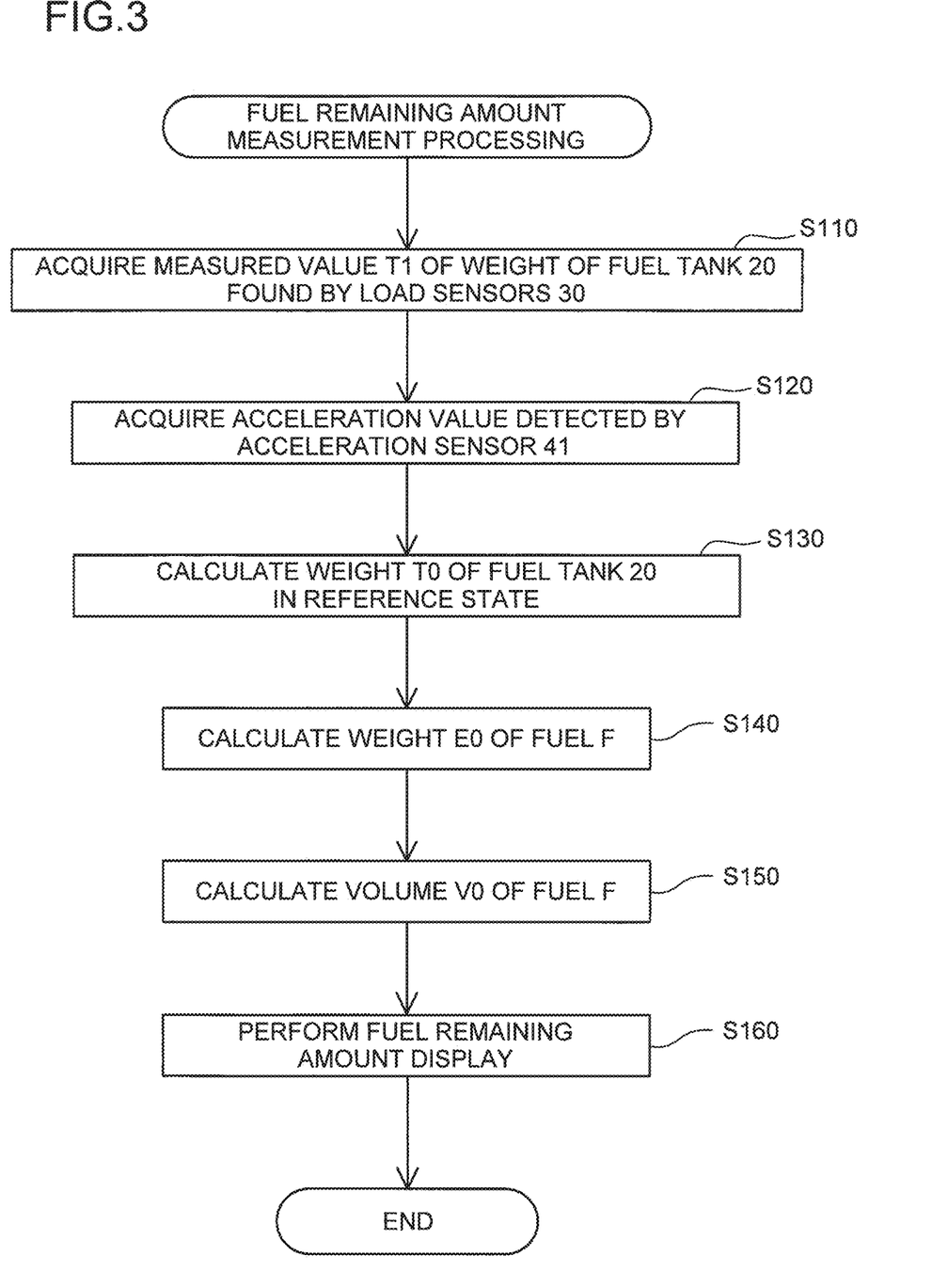
FIG. 3 is a flowchart illustrating a fuel remaining amount measurement process performed by the fuel remaining amount measuring apparatus according to the first preferred embodiment of the present invention.

FIG. 3 is a flowchart illustrating a fuel remaining amount measurement process performed by the fuel remaining amount measuring apparatus 10 according to the first preferred embodiment. The fuel remaining amount measurement process measures the remaining amount of the fuel F in the fuel tank 20.

Initially, the calculation unit 42 of the correction device 40 acquires the measured value T1 of the weight of the fuel tank 20 detected by the load sensors 30 (step S110). As described above, the measured value T1 of the weight of the fuel tank 20 detected by the load sensors 30 may include an error due to at least one of the movement and the tilt of the boat 100. The calculation unit 42 also acquires acceleration values gx, gy, and gz detected by the acceleration sensor 41 (step S120).

Next, the calculation unit 42 of the correction device 40 corrects the error based on the values detected by the acceleration sensor 41 so as to calculate the weight TO of the fuel tank 20 in the reference state (step S130). If correction is to be made with respect to the acceleration in the direction of the y-axis in FIG. 2 (acceleration caused by tilt about a longitudinal direction), for instance, the calculation unit 42 calculates the weight TO of the fuel tank 20 in the reference state according to Formula (2) below. In the formula, gy represents a current acceleration value in the direction of the y-axis output by the acceleration sensor 41, and gy0 represents the acceleration value in the direction of the y-axis output by the acceleration sensor 41 in the reference state and stored in the storage unit 43.

$$T0 = T1 \times (gy0/gy) \tag{2}$$

Next, the calculation unit 42 of the correction device 40 calculates the weight (weight in the reference state) E0 of the fuel F remaining in the fuel tank 20 according to Formula (3) below (step S140). In the formula, Te represents the weight (weight in the reference state) of the fuel tank 20 not containing the fuel F as stored in the storage unit 43.

$$E0 = T0 - Te \tag{3}$$

Next, the calculation unit 42 of the correction device 40 calculates a volume V0 of the fuel F remaining in the fuel tank 20 according to Formula (4) below (step S150). In the formula, d represents the specific gravity of the fuel F stored in the storage unit 43.

$$V0 = E0/d \tag{4}$$

Based on the remaining amount (the volume V0) of the fuel F in the fuel tank 20 thus calculated, the calculation unit 42 of the correction device 40 carries out a fuel remaining amount display through a display device not illustrated (step S160).

In the present preferred embodiment, where the fuel remaining amount measurement is performed by the fuel remaining amount measuring apparatus 10 as described above, the detection of the liquid level in the fuel tank with a float is not utilized, but the fuel remaining amount measurement in which an error due to the movement or tilt of the boat 100 is corrected is performed, which improves the accuracy of the fuel remaining amount measurement.

Second Preferred Embodiment

Figure 4:
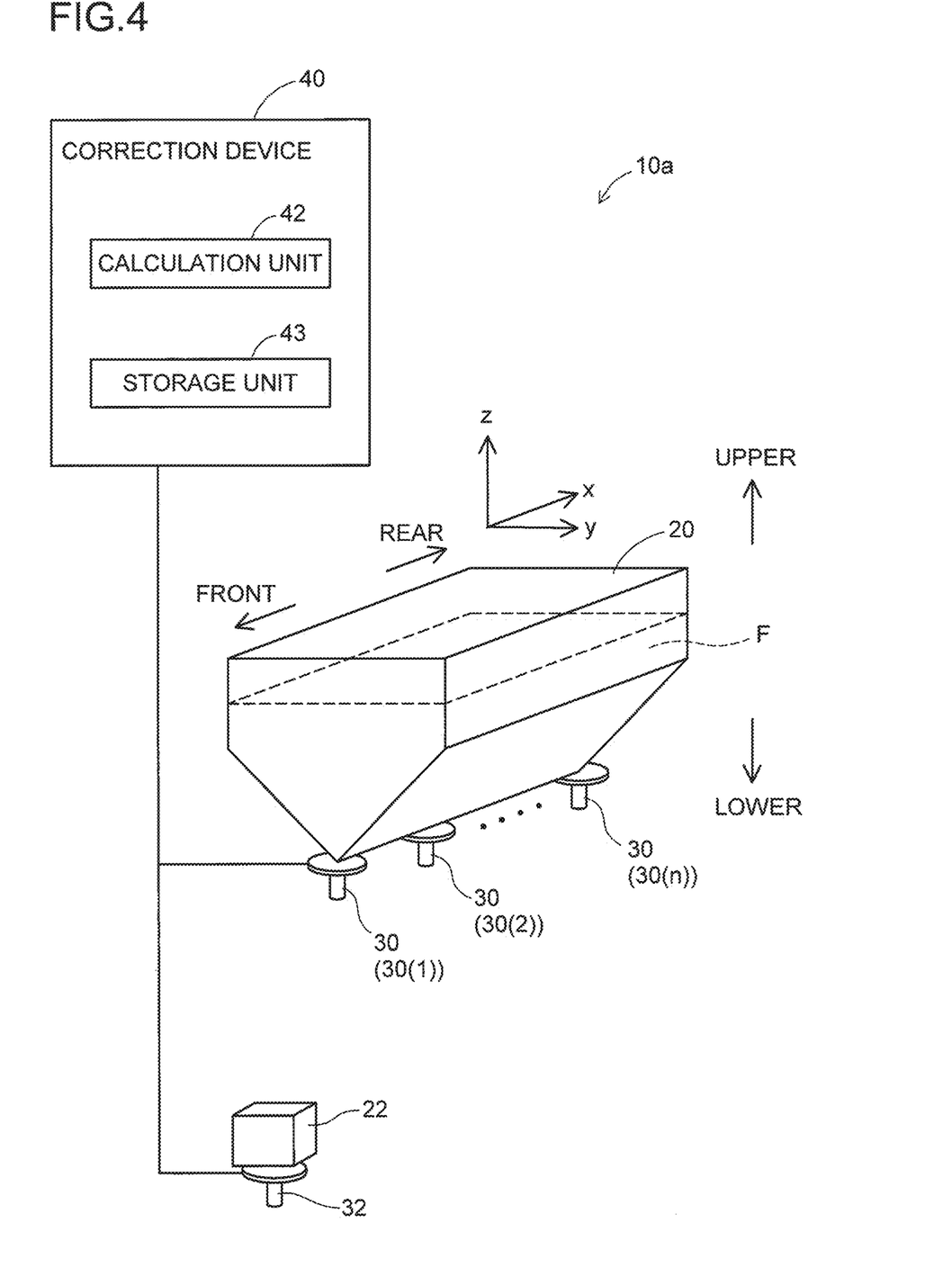
FIG. 4 is a diagram illustrating a configuration of a fuel remaining amount measuring apparatus according to a second preferred embodiment of the present invention.

FIG. 4 is a diagram illustrating a configuration of a fuel remaining amount measuring apparatus 10a according to a second preferred embodiment. In the description below, components of the fuel remaining amount measuring apparatus 10a in the second preferred embodiment that are identical to the components of the fuel remaining amount measuring apparatus 10 in the first preferred embodiment are given identical reference signs, so description thereof will be omitted as appropriate.

The fuel remaining amount measuring apparatus according to the second preferred embodiment includes a dummy weight 22 and a dummy load sensor 32. The dummy weight 22 is a weight M0 in the reference state that is known. The weight M0 in the reference state of the dummy weight 22 is stored in the storage unit 43 of the correction device 40. The dummy load sensor 32 measures the weight M1 of the dummy weight 22, and includes a load cell, for instance. The dummy load sensor 32 supports the dummy weight 22 from below, and as such outputs a measured load value LC(s) corresponding to the weight M1 of the dummy weight 22. In the present preferred embodiment, the fuel remaining amount measuring apparatus 10a includes a single dummy load sensor 32, so that a measured value of the weight M1 of the dummy weight 22 detected by the dummy load sensor 32 is equal to a value LC(s) output from the dummy load sensor 32. The fuel remaining amount measuring apparatus 10a may include a plurality of dummy load sensors 32 so as to measure the weight M1 of the dummy weight 22 with those dummy load sensors 32. In the second preferred embodiment, the correction device 40 does not include the acceleration sensor 41.

Figure 5:
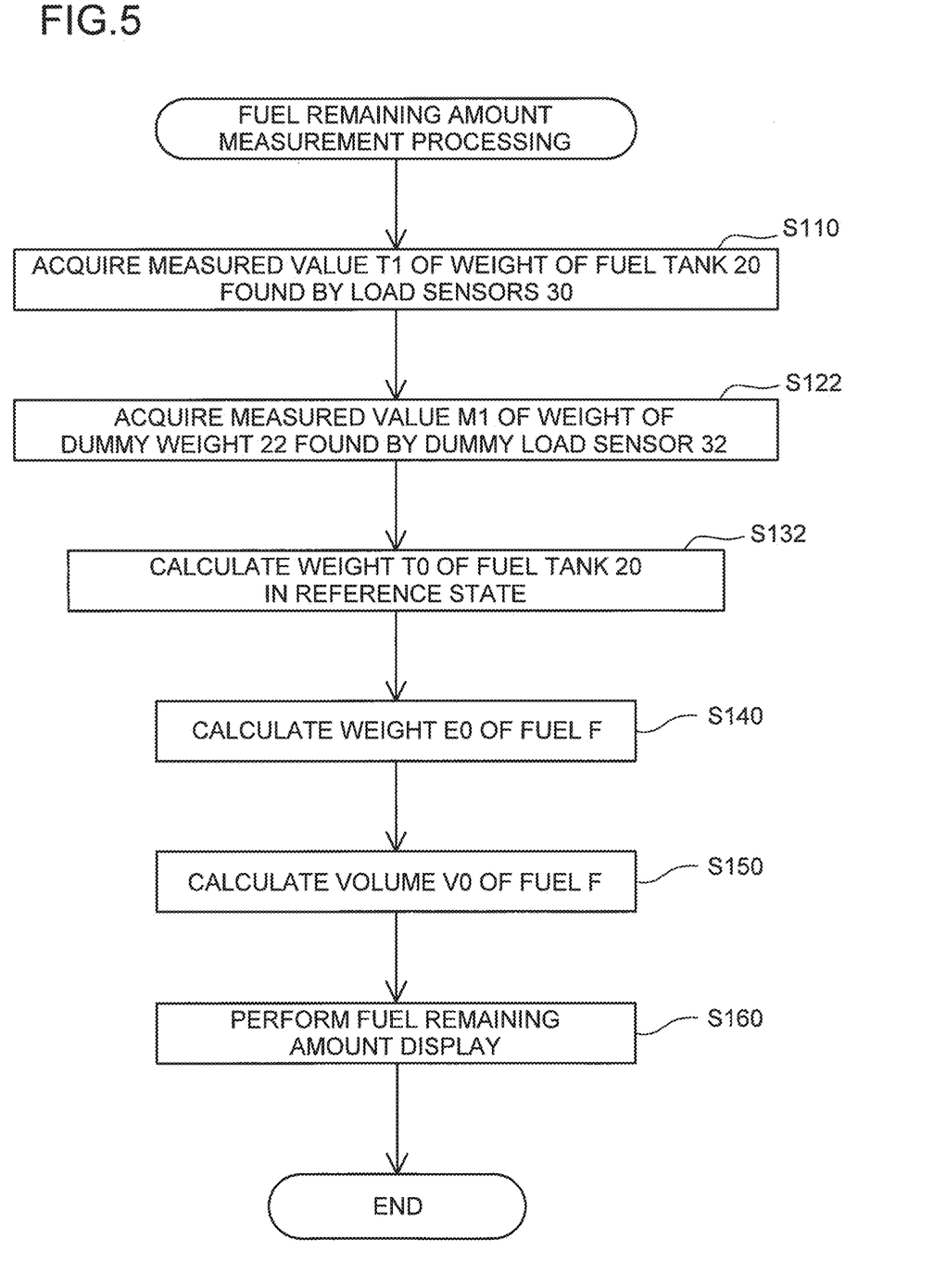
FIG. 5 is a flowchart illustrating a fuel remaining amount measurement process performed by the fuel remaining amount measuring apparatus according to the second preferred embodiment of the present invention.

FIG. 5 is a flowchart illustrating a fuel remaining amount measurement process performed by the fuel remaining amount measuring apparatus 10a in the second preferred embodiment. In the description below, steps of the fuel remaining amount measurement process in the second preferred embodiment that are identical in content to the steps of the fuel remaining amount measurement process in the first preferred embodiment are given identical reference signs, so description thereof will be omitted as appropriate.

In the fuel remaining amount measurement process in the second preferred embodiment, the calculation unit 42 of the correction device 40 performs a process to acquire the measured value of the weight M1 of the dummy weight 22 detected by the dummy load sensor 32 (step S122), instead of a process to acquire the acceleration values detected by the acceleration sensor 41 (step S120 in FIG. 3).

Next, the calculation unit 42 of the correction device 40 corrects the error based on the weight M0 in the reference state of the dummy weight 22 as stored in the storage unit 43 and the measured value of the weight M1 of the dummy weight 22 detected by the dummy load sensor 32, so as to calculate the weight TO of the fuel tank 20 in the reference state (step S132). Specifically, the calculation unit 42 calculates the weight TO of the fuel tank 20 in the reference state according to Formula (5) below. The subsequent process steps (steps S140 through S160) are identical to the process steps in the fuel remaining amount measurement process in the first preferred embodiment.

$$T0 = T1 \times (M0/M1) \tag{5}$$

Also in the second preferred embodiment, where the fuel remaining amount measurement is performed by the fuel remaining amount measuring apparatus 10a as described above, the detection of the liquid level in the fuel tank 20 with a float is not utilized, but the fuel remaining amount measurement in which an error due to the movement or tilt of the boat 100 is corrected is performed, which improves the accuracy of the fuel remaining amount measurement.

Third Preferred Embodiment

Figure 6:
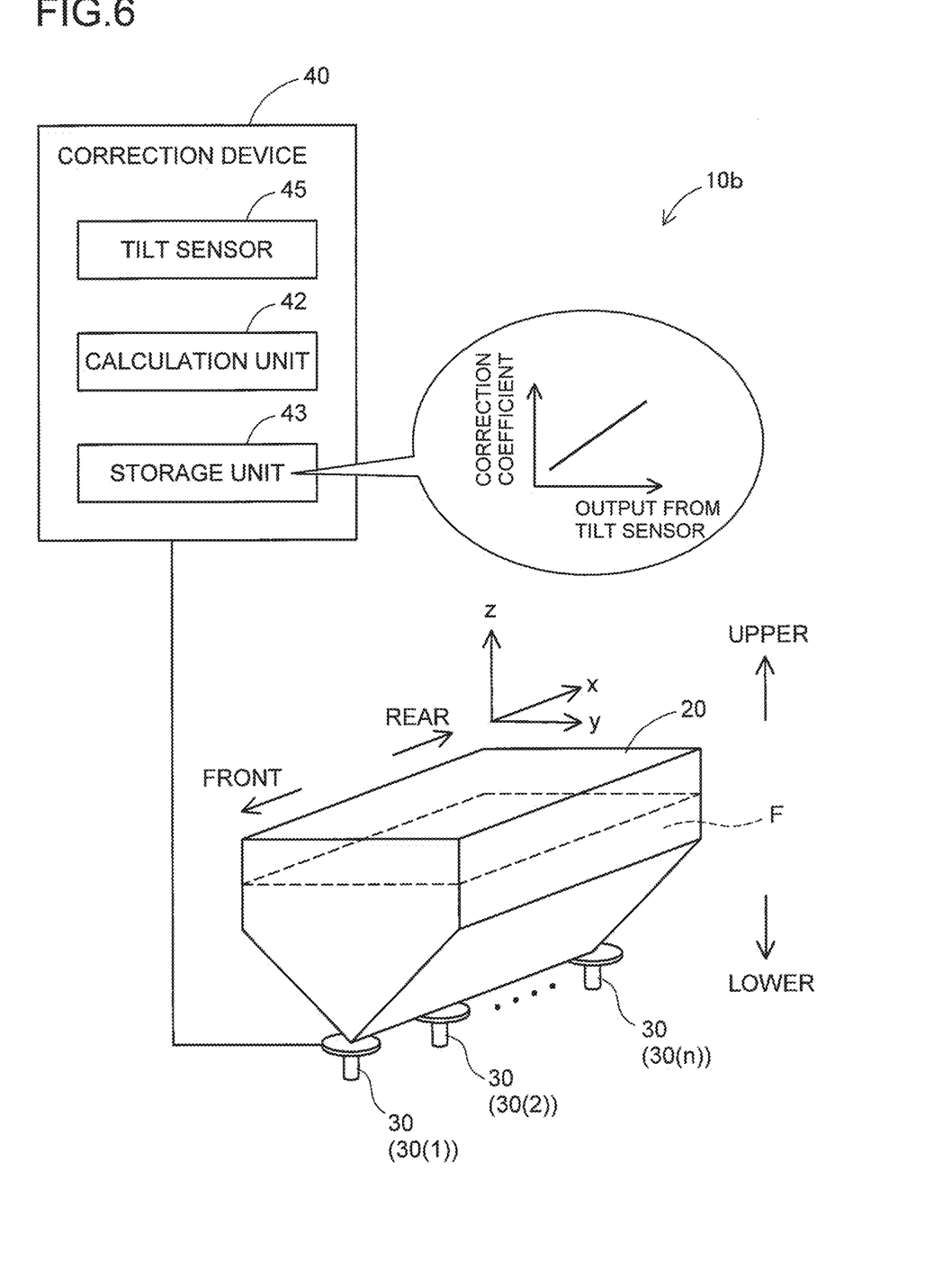
FIG. 6 is a diagram illustrating a configuration of a fuel remaining amount measuring apparatus according to a third preferred embodiment of the present invention.

FIG. 6 is a diagram illustrating a configuration of a fuel remaining amount measuring apparatus 10b according to a third preferred embodiment. In the description below, components of the fuel remaining amount measuring apparatus 10b in the third preferred embodiment that are identical to the components of the fuel remaining amount measuring apparatus 10 in the first preferred embodiment are given identical reference signs, so description thereof will be omitted as appropriate.

In the fuel remaining amount measuring apparatus 10b according to the third preferred embodiment, the correction device 40 includes a tilt sensor 45 instead of the acceleration sensor 41. The tilt sensor 45 detects the tilt of the boat 100, and is fitted to the hull 50. In the storage unit 43 of the correction device 40, a value of a correction coefficient α corresponding to an output from the tilt sensor 45 (namely, the tilt of the boat 100), which coefficient is set in advance, is stored.

Figure 7:
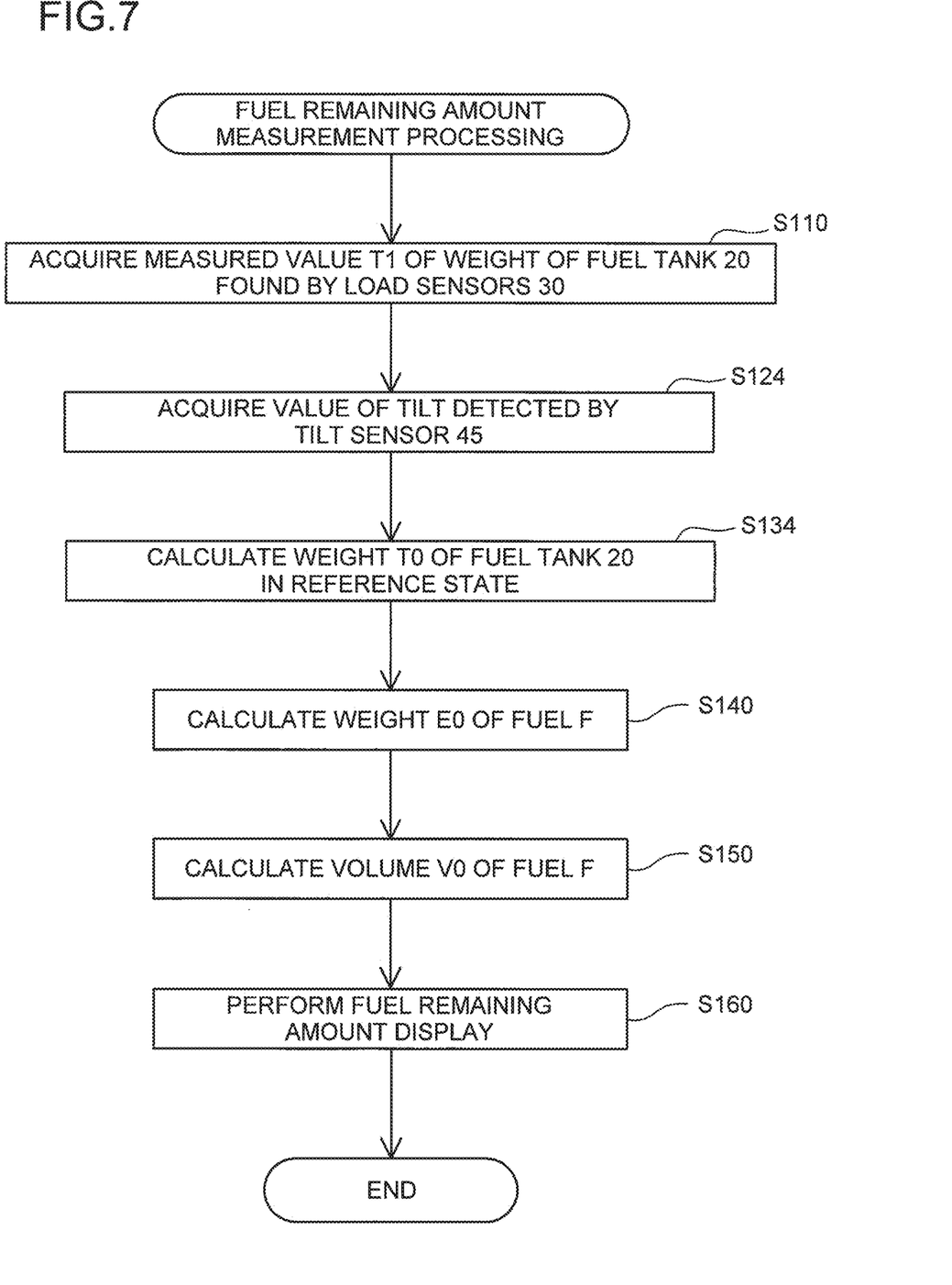
FIG. 7 is a flowchart illustrating a fuel remaining amount measurement process performed by the fuel remaining amount measuring apparatus according to the third preferred embodiment of the present invention.

FIG. 7 is a flowchart illustrating a fuel remaining amount measurement process performed by the fuel remaining amount measuring apparatus 10b according to the third preferred embodiment. In the description below, steps of the fuel remaining amount measurement process in the third preferred embodiment that are identical in content to the steps of the fuel remaining amount measurement process in the first preferred embodiment are given identical reference signs, so description thereof will be omitted as appropriate.

In the fuel remaining amount measurement process according to the third preferred embodiment, the calculation unit 42 of the correction device 40 performs a process to acquire a value of the tilt of the boat 100 detected by the tilt sensor 45 (step S124), instead of the process to acquire the acceleration values detected by the acceleration sensor 41 (step S120 in FIG. 3).

Next, the calculation unit 42 of the correction device 40 corrects the error based on the value of the tilt detected by the tilt sensor 45 so as to calculate the weight T0 of the fuel tank 20 in the reference state (step S134). Specifically, the calculation unit 42 calculates the weight T0 of the fuel tank 20 in the reference state according to Formula (6) below. In the formula, a represents a correction coefficient corresponding to the output from the tilt sensor 45, as set in advance and stored in the storage unit 43. The subsequent process steps (steps S140 through S160) are identical to the process steps in the fuel remaining amount measurement process in the first preferred embodiment.

$$T0 = T1 \times \alpha \quad (6)$$

Also in the third preferred embodiment, where the fuel remaining amount measurement is performed by the fuel remaining amount measuring apparatus 10b as described above, the detection of the liquid level in the fuel tank 20 with a float is not utilized, but the fuel remaining amount measurement in which an error due to the movement or tilt of the boat 100 is corrected is performed, which improves the accuracy of the fuel remaining amount measurement.

Modifications

The present invention is not limited to the preferred embodiments described above, but may be modified in various ways without departing from the gist of the present invention. As an example, such modifications described below are possible.

The configurations of the boat 100 and the fuel remaining amount measuring apparatuses 10, 10a, and 10b in the above preferred embodiments are presented as mere examples, and are variously modifiable. For instance, the fuel remaining amount measuring apparatuses 10, 10a, and 10b in the above preferred embodiments each include a plurality of load sensors 30, although the fuel remaining amount measuring apparatuses 10, 10a, and 10b may each include a single load sensor 30. In the first preferred embodiment, the acceleration sensor 41 detects the accelerations in the directions, where the three axes (x-axis, y-axis, and z-axis) are orthogonal to one another, respectively. The acceleration sensor 41 may detect acceleration in one or more optional directions.

The contents of the fuel remaining amount measurement process in the above preferred embodiments are presented as mere examples, and are variously modifiable. For instance, in the above preferred embodiments, the remaining amount of fuel is finally calculated as the volume so as to provide the fuel remaining amount display, although the remaining amount of fuel may be calculated as the weight so as to provide the fuel remaining amount display based on the calculated weight.

In the above preferred embodiments, the fuel tank 20 is structured with a horizontal cross-sectional area varying according to the position in the vertical direction, although the technology disclosed in the present invention is equally applicable to the fuel remaining amount measurement in a fuel tank having another shape.

In the above preferred embodiments, the fuel remaining amount measurement in the fuel tank 20 of the boat 100 is described, although the technology disclosed in the present disclosure is equally applicable to the fuel remaining amount measurement in a fuel tank of a movable body such as a vehicle or an aircraft.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel remaining amount measuring apparatus for a boat, the fuel remaining amount measuring apparatus comprising:
a fuel tank containing fuel;
a load sensor to measure a weight of the fuel tank; and
a corrector to receive a measured value T1 of the weight of the fuel tank detected by the load sensor, and to correct an error due to at least one of a movement or a tilt of the boat; wherein
the corrector includes:
an acceleration sensor to detect an acceleration of the boat;
a calculator to correct the error based on a value g of the acceleration detected by the acceleration sensor; and
a storage to store a value g0 output from the acceleration sensor in a reference state where a speed and a tilt of the boat are both zero; and
the calculator corrects the error by multiplying the measured value T1 of the weight of the fuel tank detected by the load sensor by a value g0/g.

2. The fuel remaining amount measuring apparatus according to claim 1, wherein the acceleration sensor is operable to detect at least an acceleration caused by the tilt of the boat about a longitudinal direction of the boat.

3. The fuel remaining amount measuring apparatus according to claim 1, wherein the acceleration sensor is operable to detect the acceleration of the boat in a plurality of directions.

4. The fuel remaining amount measuring apparatus according to claim 1, wherein the corrector includes:
a tilt sensor to detect the tilt of the boat; and
the calculator corrects the error based on a value of the tilt detected by the tilt sensor.

5. The fuel remaining amount measuring apparatus according to claim 1, wherein the storage stores a data value reflective of the weight of the fuel tank in a state of not containing fuel.

6. The fuel remaining amount measuring apparatus according to claim 5, wherein the storage is operable to store a specific gravity of the fuel.

7. The fuel remaining amount measuring apparatus according to claim 1, wherein the fuel remaining amount measuring apparatus comprising a plurality of load sensors, and the load sensor is one of the plurality of load sensors.

8. The fuel remaining amount measuring apparatus according to claim 1, wherein a structure of the fuel tank has a horizontal cross-sectional area that varies according to a position in a vertical direction.

9. A boat comprising:
a hull;
a propulsion device fitted to the hull; and
the fuel remaining amount measuring apparatus according to claim 1; wherein
the propulsion device is operable to use the fuel contained in the fuel tank to generate a propulsion force.

10. A fuel remaining amount measuring apparatus for a boat, the fuel remaining amount measuring apparatus comprising:
- a fuel tank containing fuel;
- a load sensor to measure a weight of the fuel tank;
- a corrector to receive a measured value of the weight of the fuel tank detected by the load sensor, and to correct an error due to at least one of a movement or a tilt of the boat;
- a dummy weight;
- a storage to store a weight of the dummy weight;
- a dummy load sensor to measure the weight of the dummy weight; and
- a calculator to correct the error based on the weight of the dummy weight stored in the storage and a measured value of the weight of the dummy weight detected by the dummy load sensor.

11. A boat comprising:
- a hull;
- a propulsion device fitted to the hull; and
- the fuel remaining amount measuring apparatus according to claim 5; wherein
- the propulsion device is operable to use the fuel contained in the fuel tank to generate a propulsion force.

12. A fuel remaining amount measuring apparatus for a movable body, the fuel remaining amount measuring apparatus comprising:
- a fuel tank containing fuel;
- a load sensor to measure a weight of the fuel tank; and
- a corrector to receive a measured value T1 of the weight of the fuel tank detected by the load sensor, and to correct an error due to at least one of a movement or a tilt of the movable body; wherein
- the corrector includes:
  - an acceleration sensor to detect an acceleration of the movable body;
  - a calculator to correct the error based on a value g of the acceleration detected by the acceleration sensor; and
  - a storage to store a value g0 output from the acceleration sensor in a reference state where a speed and a tilt of the movable body are both zero; and
- the calculator corrects the error by multiplying the measured value T1 of the weight of the fuel tank detected by the load sensor by the value g0/g.

13. A movable body comprising:
- a main body;
- a propulsion device fitted to the main body; and
- the fuel remaining amount measuring apparatus according to claim 12; wherein
- the propulsion device is operable to use the fuel contained in the fuel tank to generate a propulsion force.

14. A fuel remaining amount measuring apparatus for a movable body, the fuel remaining amount measuring apparatus comprising:
- a fuel tank containing fuel;
- a load sensor to measure a weight of the fuel tank;
- a corrector to receive a measured value of the weight of the fuel tank detected by the load sensor, and to correct an error due to at least one of a movement or a tilt of the movable body;
- a dummy weight;
- a storage to store a weight of the dummy weight;
- a dummy load sensor to measure the weight of the dummy weight; and
- a calculator to correct the error based on the weight of the dummy weight stored in the storage and a measured value of the weight of the dummy weight detected by the dummy load sensor.

15. A movable body comprising:
- a main body;
- a propulsion device fitted to the main body; and
- the fuel remaining amount measuring apparatus according to claim 14; wherein
- the propulsion device is operable to use the fuel contained in the fuel tank to generate a propulsion force.

* * * * *